United States Patent
Katayama

(10) Patent No.: US 6,905,182 B2
(45) Date of Patent: Jun. 14, 2005

(54) ELASTIC CRAWLER

(75) Inventor: Teruyuki Katayama, Osaka (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/132,300

(22) Filed: Apr. 26, 2002

(65) Prior Publication Data

US 2002/0175563 A1 Nov. 28, 2002

(30) Foreign Application Priority Data

May 23, 2001 (JP) ........................................ 2001-154276

(51) Int. Cl.[7] ............................................. B62D 55/205
(52) U.S. Cl. ........................ 305/157; 305/173; 305/195
(58) Field of Search ................................ 305/157, 177, 305/160, 161, 162, 165, 167, 178, 179, 174, 173, 195; 74/229, 231 C

(56) References Cited

U.S. PATENT DOCUMENTS

| | | | | |
|---|---|---|---|---|
| 3,118,709 A | * | 1/1964 | Case ........................... | 305/170 |
| 3,863,727 A | * | 2/1975 | Michrina ..................... | 180/9.5 |
| 3,930,689 A | * | 1/1976 | Maki ........................... | 305/180 |
| 4,035,036 A | * | 7/1977 | Boggs et al. ................ | 305/197 |
| 4,079,633 A | * | 3/1978 | Cheema et al. ............. | 226/74 |
| RE37,174 E | * | 5/2001 | Grawey et al. ............. | 180/9.21 |
| 6,264,293 B1 | * | 7/2001 | Musselman et al. ......... | 305/178 |
| 6,402,268 B1 | * | 6/2002 | Lussier ........................ | 305/165 |
| 6,450,384 B1 | * | 9/2002 | Chinzei et al. .............. | 226/59 |
| 6,474,756 B2 | * | 11/2002 | Hori et al. ................... | 305/178 |

FOREIGN PATENT DOCUMENTS

| | | | |
|---|---|---|---|
| FR | 1 308 381 | 11/1962 | |
| GB | 2 288 580 A | 10/1995 | |
| GB | 2288580 A | * 10/1995 | ........... B62D/55/24 |

* cited by examiner

Primary Examiner—Frantz F. Jules
(74) Attorney, Agent, or Firm—Nixon Peabody LLP; David S. Safran

(57) ABSTRACT

An elastic crawler has a crawler body formed like an endless belt out of an elastic material, a plurality of driving projections provided on an inner circumferential surface of the crawler body with a predetermined pitch in the circumferential direction thereof, and a plurality of traction lugs provided on an outer circumferential surface of the crawler body with a pitch different from that of the driving projections.

2 Claims, 3 Drawing Sheets

ELASTIC CRAWLER

BACKGROUND OF THE INVENTION

1. Field of the Invention

This invention relates to an elastic crawler.

2. Description of the Prior Art

An elastic crawler used for a civil engineering machine as well as a construction machine, an agricultural machine and a snowmobile is generally formed by providing an outer circumferential surface of an endless belt-like crawler body of an elastic material, such as rubber with lugs with a predetermined pitch which are adapted to eat into the ground and generate a tractive force. This elastic crawler is passed around a driving wheel, a driven wheel and rolling wheels in a track frame to form an endless track vehicle.

Such an elastic crawler is driven and travels by a so-called meshed transmission system and a so-called friction transmission system. Out of these systems, the meshed transmission systems include a system having a sprocket as a driving wheel provided on an outer circumferential portion thereof with a multiplicity of projecting driving pins with a predetermined pitch in the circumferential direction thereof, and on an inner circumferential surface thereof with driving projections with a predetermined pitch. The elastic crawler is turned and travels by engaging the driving pins with these driving projections.

Since the driving projections are engaged with the driving wheel, the projections are provided on the crawler body with the same pitch, of course, as the driving pins.

On the other hand, the lugs are provided in most cases with the same pitch and in the same circumferential positions as the driving projections.

Namely, the related art elastic crawler is formed on the basis of a designing concept that the pitch of the driving projections is set in accordance with that of the driving pins with the pitch of the lugs set in accordance with that of the driving projections.

In order to reliably effect the transmission of power of the driving wheel, setting the pitch of the driving pins and driving projections smaller is desirable. However, when the pitch of the lugs is set small as well in accordance with that of the driving projections, the possibility that the tractive force is lost due to the mud collected in recesses between the lugs becomes high. In addition, the bending characteristics of a driving wheel-wrapping portion of the crawler become inferior, so that there was the possibility that the dislocation of the wheel occurs.

Moreover, since the weight of the elastic crawler increases, the crawler was not suitably used for a vehicle traveling at a comparatively high speed, such as a vehicle which can travel on a public road and a snowmobile.

SUMMARY OF THE INVENTION

The objects of the present invention include providing in view of these circumstances an elastic crawler capable of securing a tractive force of the lugs, and the bending characteristics of a driving wheel-wrapping portion thereof, and reducing the weight thereof, by arranging the driving projections and lugs in a suitable manner.

To achieve the obtainment of this elastic crawler, the following techniques are employed.

Namely, the elastic crawler according to the present invention include a crawler body formed like an endless belt out of an elastic material, a plurality of driving projections provided on an inner circumferential surface of the crawler body with a predetermined pitch in the circumferential direction thereof, and a plurality of traction lugs provided on an outer circumferential surface the crawler body with a pitch different from that of the driving projections in the circumferential direction thereof.

In short, a basic concept of the present invention is that the positions of the lugs are set without depending upon those of the driving projections so that each of the projections and lugs functions optimumly.

Therefore, the driving projections can be provided with a smaller pitch so as to attain the reliable transmission of a driving force, while the lugs can be provided with a pitch larger than that of the driving projections without depending upon the positions of the driving projections so as to prevent the earth from being collected in the recesses between the lugs, secure the bending characteristics of the driving wheel-wrapping portion thereof and reduce the weight of the crawler body.

To be concrete, it is recommended that the pitch of the lugs be set to LP≅1.5 GP wherein LP represents the pitch of the lugs; and GP that of the driving projections.

It is also recommended that the lugs and driving projections be provided in circumferentially staggered positions over the whole circumference of the crawler body.

Over the whole circumference of the crawler body formed in this manner, a scatter of the bending rigidity of the crawler body in the circumferential direction thereof becomes low, and the bending characteristics of the wheel-wrapping portion thereof can be kept well balanced. Therefore, this crawler body serves to prevent the dislocation of the wheels.

Other objects, features and effects of the present invention will be fully understood from the following description.

BRIEF DESCRIPTION OF THE DRAWINGS

Preferred embodiments of the present invention will be described with reference to the following figures, wherein.

DETAILED DESCRIPTION OF THE PREFERRED EMBODIMENTS

The modes of embodiment of the present invention will now be described with reference to the drawings.

Figure 1:
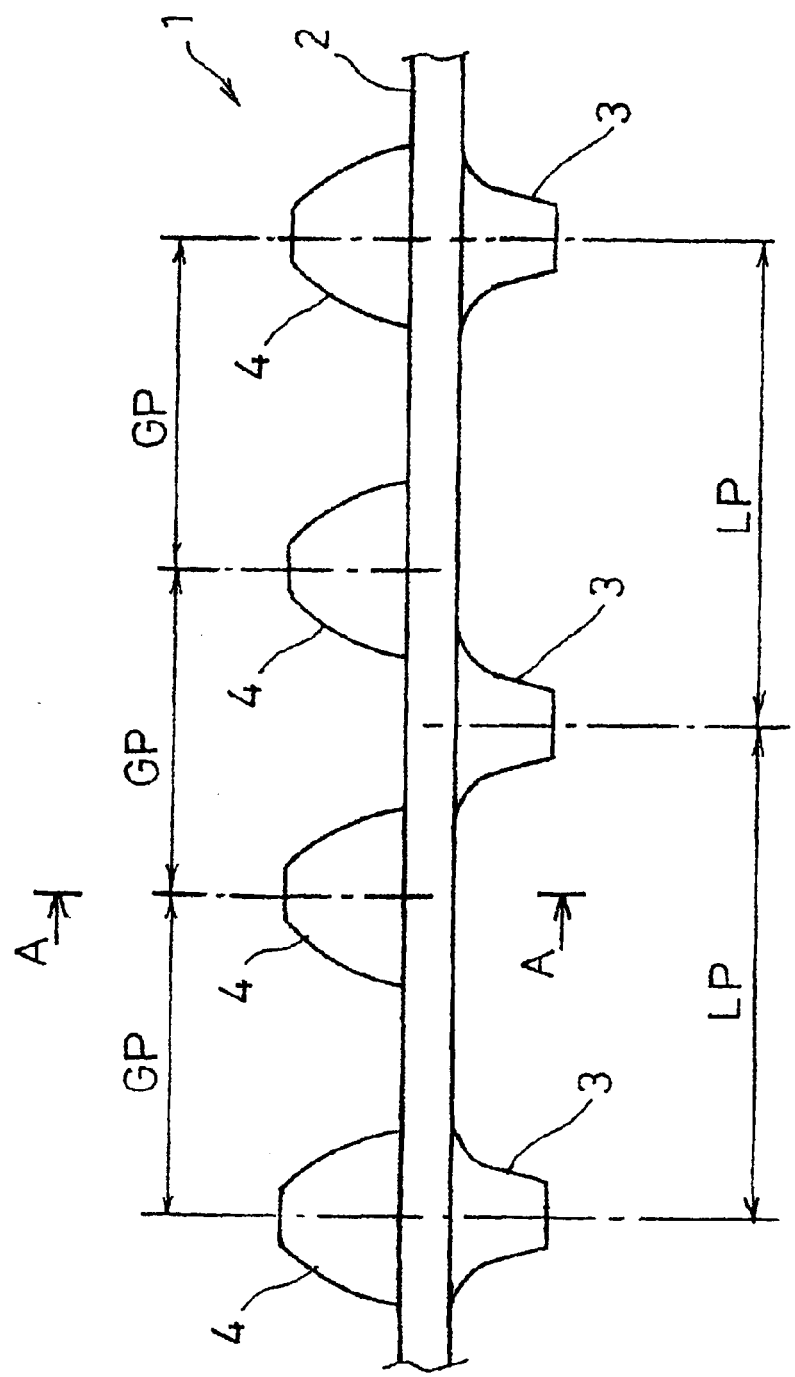
FIG. 1 is a side view of a mode of embodiment of the elastic crawler according to the present invention.

FIG. 1 shows a mode of embodiment of an elastic crawler 1 according to the present invention.

This elastic crawler 1 has a crawler body 2 formed like an endless belt out of an elastic material, such as rubber. The crawler body 2 is formed mainly by providing traction lugs 3 with a predetermined pitch LP on an outer circumferential surface thereof, and driving projections 4 with a predetermined pitch GP on an inner circumferential surface thereof. The crawler body 2 is adapted to be passed around a driving wheel, a driven wheel and rolling wheels in a track frame of an endless track vehicle.

Figure 2A:
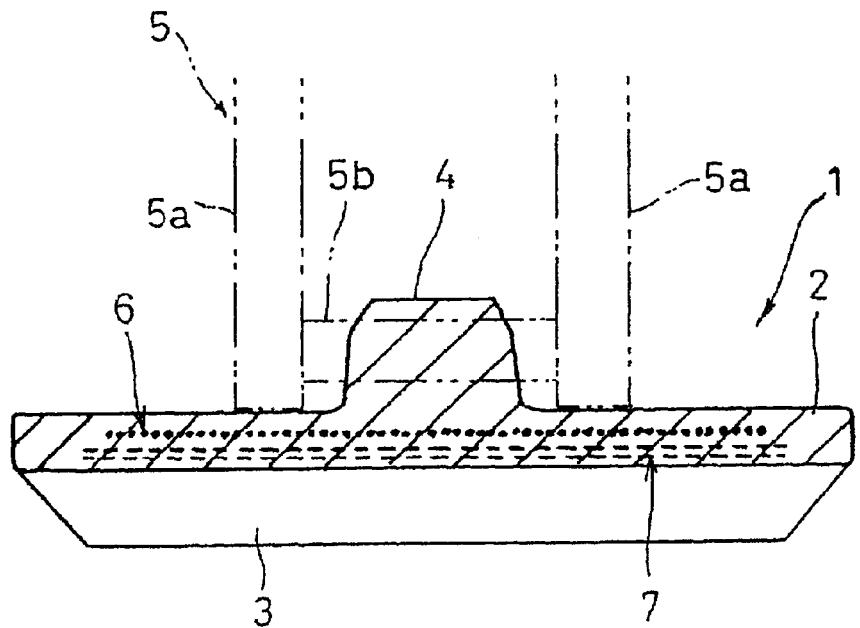
FIG. 2A and FIG. 2B illustrate a sectional view taken along the line A—A designated by arrows in FIG. 1 of two differently shaved drive projections according to the present invention.
Figure 2B:
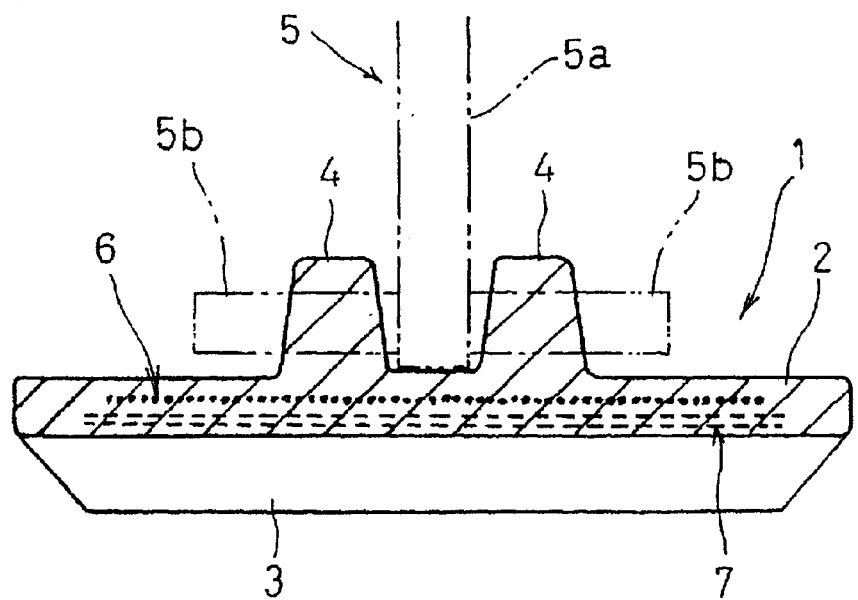

The driving projections 4 are made integral with the crawler body 2 and of an elastic material identical with that of the crawler body 2. These projections 4 can be formed solely on a widthwise central portion of the crawler body 2 as shown in FIG. 2A, or doubly on left and right portions thereof as shown in FIG. 2B. Although a side elevation of the driving projections 4 is substantially mountain-shaped, the side elevational shape thereof is not limited to this.

A driving wheel 5 employed of an endless track vehicle is formed by providing a driving pin 5b with a predetermined pitch in the circumferential direction between the outer circumferential portions of left and right driving discs 5a as shown in FIG. 2A, or projecting driving pins 5b with a predetermined pitch in the circumferential direction from the outer circumferential portions of both side surfaces of a driving disc 5a as shown in FIG. 2B.

When these driving pins 5b are engaged with the driving projections 4, a rotational force of the driving wheels 5 is transmitted to the crawler body 2 to cause the crawler body 2 to travel as it turns.

Therefore, the pitch GP of the driving projections 4 is set equal to that of the driving pins 5b of the driving wheel 5.

In an inner portion of the crawler body 2, a circumferentially extending tension member 6 formed by parallel-winding a circumferentially endless reinforcing cord in the widthwise direction, or a widthwise extending tension member 7 formed by parallel-winding a bias-arranged reinforcing cord in the circumferential direction is buried. The circumferential elongation of the elastic crawler 1 is restricted by the circumferentially extending tension member 6, and the widthwise bending rigidity (lateral rigidity) thereof is improved by the widthwise extending tension member 7.

In the crawler body 2, a reinforcing body (so-called core bar) to be laterally placed of a metal or a hard resin can be suitably buried. In an inner portion of the driving projection 4, a core member can also be buried.

However, in a snowmobile and a comparatively high speed endless track vehicle capable of traveling on a public road, a core bar causes the weight thereof to increase, and the generation of noise and vibration to occur. Therefore, the crawler body is preferably formed to a non-core-bar-carrying (coreless) type structure just as the illustrated example thereof.

The lugs 3 are made of the same material as and integral with the crawler body 2. The lugs 3 can employ various modes of structure, i.e., linearly formed lugs extending over the whole width of the crawler body 2, lugs of a combination of linearly extending longer lugs and linearly extending shorter lugs which are arranged alternately in the circumferential direction in a widthwise centered state, lugs arranged in the shape of the symbol "<" or the letter upside down "V", and lugs laterally divided and arranged in a staggered manner can be employed. In any of these modes of lugs, the lugs are arranged with a predetermined pitch LP in the circumferential direction.

The pitch LP of the lugs 3 in the circumferential direction is not equal to that GP of the driving projections 4. In this mode of embodiment, the pitch LP is set to LP=1.5 GP.

Therefore, even when the pitch GP of the driving projections 4 is set small in accordance with that of the driving pins 5a, the pitch LP of the lugs 3 becomes larger than that GP of the driving pins. This enables the frequency of occurrence of collection of the mud in recesses between the lugs 3 to decrease, the bending characteristics of the portion of the crawler body which is passed around the driving wheel 5 to be improved, and the possibility of occurrence of dislocation of the wheels to be reduced.

The crawler body is formed so that the relation of $L=LP \cdot N1=GP \cdot N2$, wherein L represents the length of the crawler body 2; N1 the number of the lugs 3; and N2 the number of the driving projections 4, is satisfied.

In the case of the example of FIG. 1, a driving projection 4 and a lug 3 are disposed in the same circumferential position (the circumferentially central positions of the driving projection 4 and lug 3 agree with each other) on a certain portion of the crawler body 2, and have the relation satisfying LP=1.5 GP. Accordingly, every second lug 3 and every third driving projection 4 which are counted from such reference lug 3 and driving projection 4 which are in the same position are provided in the same position.

Figure 3:
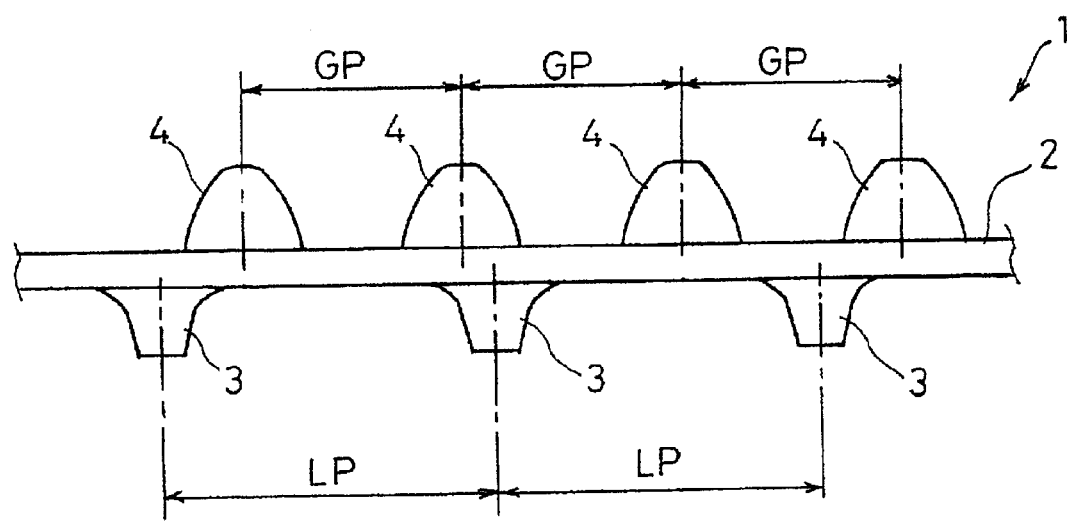
FIG. 3 is a side view of another mode of embodiment of the elastic crawler according to the present invention.

However, it is also possible as shown in FIG. 3 that the phases (circumferentially central positions) of the lugs 3 and driving projections 4 be shifted from each other over the whole circumference of the crawler body 2.

When this structure is employed, a scatter of the bending characteristics of the crawler body 2 can be reduced over the whole circumference thereof.

Namely, in the mode of embodiment shown in FIG. 1, the rigidity of the portion of the crawler body on which a lug 3 and a driving projection 4 are formed in the circumferentially same position increases noticeably, and the crawler body becomes difficult to be bent locally. Therefore, there is the possibility that the engagement of this circumferential portion of the crawler body with the driving wheel 5 becomes unsatisfactory, and this causes a loss of transmission of power and the dislocation of the wheels to occur.

On the other hand, when the phases of the lugs 3 and driving projections 4 are shifted from each other over the whole circumference of the crawler body 2 as shown in FIG. 3, there is not substantially any portion the rigidity of which becomes noticeably high like the mentioned portion of the example of FIG. 1, and a scatter of the rigidity of the crawl body over the whole of the circumference thereof decreases. Therefore, the well balanced bending characteristics of the driving wheel-wrapping portion of the crawl body can be attained.

In this mode of embodiment, the pitch LP of the lugs 3 is set as 1.5 times as large as that of the driving projections 4. This magnifying factor can be changed suitably.

However, when this magnifying factor is set too large, the circumferential intervals of the lugs 3 become too large. As a result, a tractive force of the lugs 3 is lost, and the possibility that the driving wheel falls into a space between adjacent lugs 3 to cause vibration to occur arises. Conversely, when the magnification factor is too small, the above-mentioned operation and effect become difficult to be obtained. Therefore, it is more preferable that the pitch LP be set to around LP=1.5 GP as in the above-described mode of embodiment.

In a certain case, it is also possible that the pitch LP of the lugs 3 be set smaller than that GP of the driving projections 4.

According to the present invention described in detail above, the lugs and driving projections can be arranged suitably in accordance with the respective functions. This enables the tractive force of the lugs and the bending characteristics of the driving wheel-wrapping portion of the crawler body to be secured, and the weight of the crawler body to be reduced.

The present invention is not limited to the above-described modes of embodiment, and modifications within the range of what are defined in the claims can be suitably made.

What is claimed is:

1. An elastic crawler comprising:

a crawler body having the shape of an endless belt and composed of an elastic material, the crawler body being provided with a circumferentially extending tension member and a widthwise extending tension member embedded therein, a plurality of driving projections provided on an inner circumferential surface of the crawler body having a predetermined pitch (GP) and a center-to-center phase between adjacent driving projections in the circumferential direction thereof, and a plurality of traction lugs provided on an outer circumferential surface of the crawler body having a predetermined pitch (LP) and a center-to-center phase between adjacent traction lugs, wherein the predetermined constant pitch (LP) of the traction lugs is set larger than the predetermined constant pitch (GP) of the driving projections in the circumferential direction thereof, wherein the phases of the lugs and driving projections are shifted from each other in the circumferential direction over the whole circumference of the crawler body, wherein the pitch (LP) of the lugs and that (GP) of the driving projections are set to LP ≅ 1.5 GP so as to reduce a scatter of bending rigidity of the crawler body in the circumferential direction and to retain well balanced bending characteristics of driving wheel wrapping portions of the crawler body, wherein the circumferentially extending tension member is formed of a parallelly wound, circumferentially endless reinforcing cord that is embedded in an inner portion of the elastic material for restricting circumferential elongation of the elastic crawler, and wherein the widthwise extending tension member is formed of a bias-arranged reinforcing cord that has been parallel-wound and embedded in an inner portion of the elastic material for improving widthwise bending rigidity.

2. An elastic crawler comprising:

a crawler body having the shape of an endless belt and composed of an elastic material, the crawler body being provided with a circumferentially extending tension member and a widthwise extending tension member embedded therein, a plurality of driving projections provided on an inner circumferential surface of the crawler body having a predetermined pitch (GP) and a center-to-center phase between adjacent driving projections in the circumferential direction thereof, and a plurality of traction lugs provided on an outer circumferential surface of the crawler body having a predetermined pitch (LP) and a center-to-center phase between adjacent traction lugs, wherein the predetermined pitch (LP) of the traction lugs is set larger than the predetermined pitch (GP) of the driving projections in the circumferential direction thereof, wherein the pitch (LP) of the lugs and that (GP) of the driving projections are set to LP ≅ 1.5 GP so as to reduce a scatter of bending rigidity of the crawler body in the circumferential direction and to retain well balanced bending characteristics of driving wheel wrapping portions of the crawler body;

wherein the circumferentially extending tension member is formed of a parallelly wound, circumferentially endless reinforcing cord that is embedded in an inner portion of the elastic material for restricting circumferential elongation of the elastic crawler, and wherein the widthwise extending tension member is formed of a bias-arranged reinforcing cord that has been parallel-wound and embedded in an inner portion of the elastic material for improving widthwise bending rigidity.

* * * * *